J. R. NAYLOR.
HARROW.
APPLICATION FILED MAY 25, 1909.

954,759.

Patented Apr. 12, 1910.
6 SHEETS—SHEET 2.

FIG. 2.

Witnesses:
J. H. Alfreds
W. H. Hall

Inventor
Jonathan R. Naylor
by Poole & Brown
Attys

J. R. NAYLOR.
HARROW.
APPLICATION FILED MAY 25, 1909.

954,759.

Patented Apr. 12, 1910.
6 SHEETS—SHEET 3.

Witnesses:

Inventor
Jonathan R. Naylor
by Poole & Brown
Attys

J. R. NAYLOR.
HARROW.
APPLICATION FILED MAY 25, 1909.

954,759.

Patented Apr. 12, 1910.
6 SHEETS—SHEET 4.

Witnesses:

Inventor
Jonathan R. Naylor
by Poole Brown Attys

J. R. NAYLOR.
HARROW.
APPLICATION FILED MAY 25, 1909.

954,759.

Patented Apr. 12, 1910.
6 SHEETS—SHEET 6.

Witnesses:

Inventor
Jonathan R. Naylor
by Poole & Brown
Attys

UNITED STATES PATENT OFFICE.

JONATHAN R. NAYLOR, OF LA GRANGE, ILLINOIS, ASSIGNOR TO NAYLOR MANUFACTURING COMPANY, A CORPORATION OF ILLINOIS.

HARROW.

954,759.  Specification of Letters Patent.  Patented Apr. 12, 1910.

Application filed May 25, 1909. Serial No. 498,198.

*To all whom it may concern:*

Be it known that I, JONATHAN R. NAYLOR, a citizen of the United States, and a resident of La Grange, in the county of Cook and State of Illinois, have invented certain new and useful Improvements in Harrows; and I do hereby declare that the following is a full, clear, and exact description thereof, reference being had to the accompanying drawings, and to the numerals of reference marked thereon, which form a part of this specification.

This invention relates to improvements in harrows and refers to improvements in disk harrows and combined disk and toothed harrows.

Among the objects of the invention is to provide an improved means for adjusting the angle of the disks relatively to the path of the harrow; to provide an improved construction for adjusting the disks to throw the earth toward one side or the other of the path of the harrow as desired; to provide an improved arrangement in disk harrows whereby the harrow is carried in balance upon the disks, thus avoiding the necessity of using a draft tongue, and to provide a novel combination in a combined disk and toothed harrow arranged to enable the teeth to be conveniently thrown out of action.

Other objects of the invention will appear from the following description, and the invention consists in the matters hereinafter set forth and more particularly pointed out in the appended claims.

I have shown my invention embodied in a combined disk and toothed harrow consisting of two lateral disk sections 12 and rear toothed sections 14, 14, one of the latter extending across the rear end of each disk section. Each disk section consists of side members 15, 16 and a front member 17 which are rigidly connected by corner pieces 18. If the harrow be a plain disk harrow, a rear member would be connected to and join the rear ends of the side members. As herein shown, however, the toothed sections join the rear ends of the side members of the disk section frames. Each of said toothed sections comprises two transverse, parallel bars 20, 20 which carry spike pieces 21, 21. The said tooth carrying bars are connected at their ends by end members 22, 22 which extend forwardly beyond the bars 20 and are hinged at their front ends to the rear ends of the side members 15, 16 by hinge bolts 24. The said toothed sections of the harrow are adapted to be swung upwardly into the dotted line position indicated in Fig. 4, and to be in this position carried by the disk section when the harrow is moved from place to place. The two lateral sections of the harrow, each comprising a disk section and a toothed section, are hinged together at their inner sides by horizontal pivot pins 26, 26 which extend through overlapping lugs 27, 27 on the inner sides of the inner members of the sections. Said hinges permit relative vertical movement of the lateral sections to adapt the harrow to uneven ground.

Each disk section carries transversely inclined, horizontal shafts 30, 30 upon which are mounted disks 31, 31 of common form, they being of concavo-convex shape. The disks are fixed to the shafts by means of split hubs 32 arranged in alinement with central openings of the disks, and the split hubs are clamped on the shafts by clamping bolts 33 extending through apertured lugs integral with the split hubs. Each of said disk sections is provided with at least two disk supporting shafts 30, 30, arranged one in front of the other, and the disks 31 of each section are arranged out of line with each other, or with the disks of a rear shaft arranged in rear of and between two adjacent disks of a forward shaft. The arrangement of a plurality of sets of disks in a section or frame, located one in front of the other, enables the frame to be carried horizontal and stable on the rolling disks and avoids the necessity of a draft tongue to balance the frame on the disks.

The disk carrying shafts 30 are rotatively mounted at their ends in inner and outer bearing boxes 35, 36, respectively. The said boxes are divided in horizontal planes and the upper and lower parts thereof are clamped together by bolts 38. The shafts 30 engage bearing sleeves or bushings 39 within said boxes, which may be made of wood, fiber or other oil-absorbing material. Dust guards or caps 41 surround the shafts at the inner ends of the said boxes and are attached to the boxes by means of hook bolts 42, shown best in Fig. 6, which engage the clamping bolts 38.

The boxes 36 at the outer end of the shafts are hinged to the outer side members of the frame by vertical hinge bolts 45 which extend through overlapping hinge lugs 46 and 47 on said boxes and side frame members, respectively. The hinge lugs 46 of the boxes may be made integral with the boxes, while the hinge lugs 47 are made integral with fittings which are removably attached to the side frame members by bolts 48. The boxes 35 carrying the inner ends of the disk shafts engage guide and supporting brackets 49 which are bolted to the inner sides of the side members 16 of the section frames. The said guide and supporting brackets are provided with grooves or ways 50 which are curved concentrically with respect to the hinge bolts 45 of the outer bearing boxes 36, which ways or grooves are engaged by parts extending inwardly from and rigid with the inner bearing boxes. The supporting and guide brackets 49 thus arranged constitute means for supporting the inner ends of the disk shafts on the inner sides of the frames, while permitting said inner ends of the shafts to be swung forwardly and rearwardly, as desired, to adjust the disks to the soil. As herein shown, the inner bearing boxes 35 are provided with laterally extending, rigid lugs 52 and the supporting and guiding brackets 49 are provided with horizontally arranged grooves or ways 50 into which said lugs extend.

For swinging the inner ends of the disk shafts about their hinges to adjust the angle of the disks to the ground, the following construction is provided: Extending between and connecting the bearing boxes at the inner ends of the disk shafts are bars 55 constituting spacing and connecting bars for said shafts, and also, as herein shown, means for giving simultaneous movement to the shafts. The connection between said bars and bearing boxes consists, as herein shown, of upwardly extending lugs 56, 56 on the ends of horizontal brackets 57 herein shown as formed integral with the lower ends of standards 58, 58 which are secured to and rise from the inner bearing boxes, and the ends of said bars 55 are apertured to fit over said lugs. The said standards 58 constitute, in connection with other standards 59, 59 which are fixed to and rise from the outer bearing boxes 36 of the shafts, parts of a supporting frame 60 located over the disks of each section, and upon which frame is mounted a seat 61 and cleaning devices for the disks, as will hereinafter fully appear. The said spacing and connecting bars 55 are connected at their inner ends by cables 64 with drums 65 which are rotatively mounted on horizontal pins or bolts 66 mounted in the upper ends of standards 67 which are attached to and extend upward from the front frame members 17 of the sections near their inner ends. The said drums are provided with ratchet teeth 69 and are adapted to be rotated by actuating pawls 70 carried by adjusting levers 71 which are pivotally mounted on said bolts or pins 66. The pawls 70 engage, by gravity (or spring pressure) the ratchet teeth 69 of the drums. When the levers 71 are swung rearwardly, the drums 65 are rotated in a direction to wind the cables 64 thereon and to draw the bars 55 forwardly and swing the inner ends of the disk shafts forwardly; said inner ends of the disk shafts, by reason of their connection with said bars 55, moving together. As said shafts are swung forwardly the lugs 52 of the inner bearing boxes travel in the grooves or ways 50 of the supporting and guide brackets 49. The said ratchet drums are locked from backward rotation by spring pressed detents 72 which are pivoted to the drum supporting standards 67 below said drums and engage the ratchet teeth of said drums. The detents are held in their locking positions by suitably applied springs 73. They are released from the ratchet teeth by means of finger levers 74 pivoted to the adjusting levers 71 near their outer ends and connected with the detents by flexible strands or wires 75. The actuated pawls 70 are adapted to be retracted from the ratchet teeth 69 of the winding drums through the medium of said finger levers 74 which are connected to the actuating pawls by means of links 76. The disk shafts 30 may be allowed to swing rearwardly at their inner ends, as the harrow is drawn forwardly, by releasing the actuating pawls 70 and locking detents 72 from the ratchet drums. Means may be provided, however, to positively swing the said inner ends of the disk shafts rearwardly, as will be required when the harrow is standing still, and as may be required, when the harrow is moving forwardly, should the grooved ways for the disk shafts become clogged.

Figure 2:
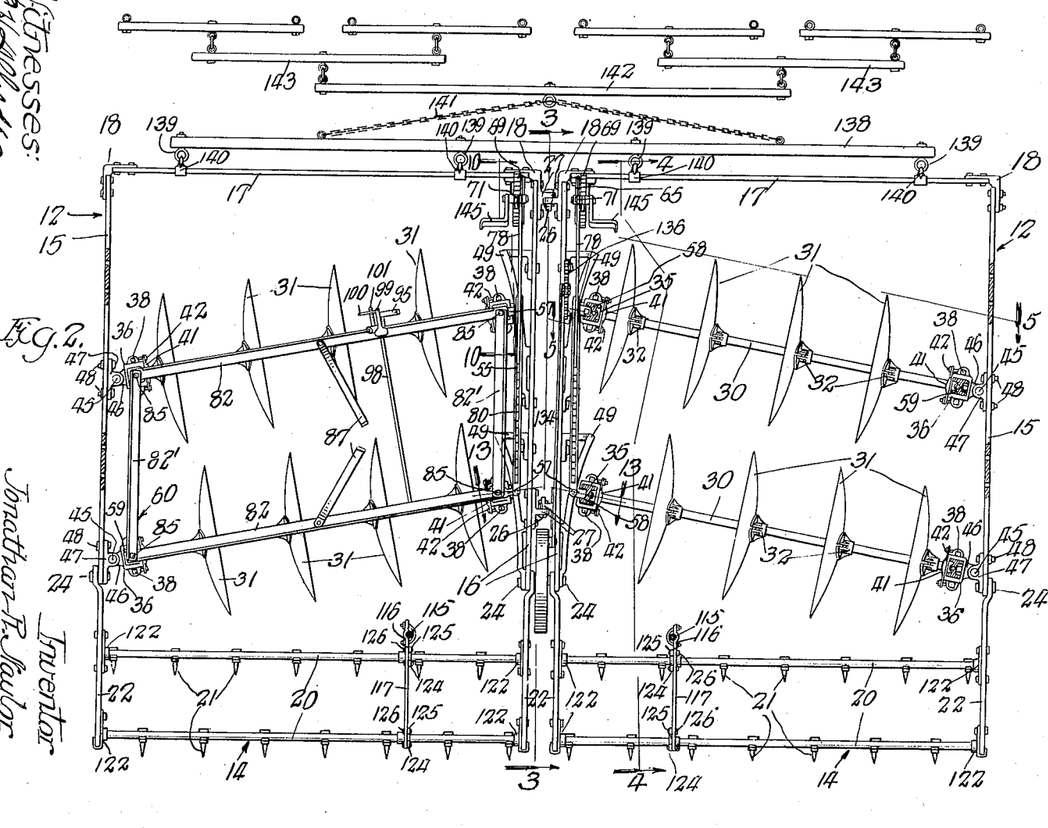
Fig. 2 is a partial plan view and partial horizontal section thereof.
Figures 10, 11, 12, 13:
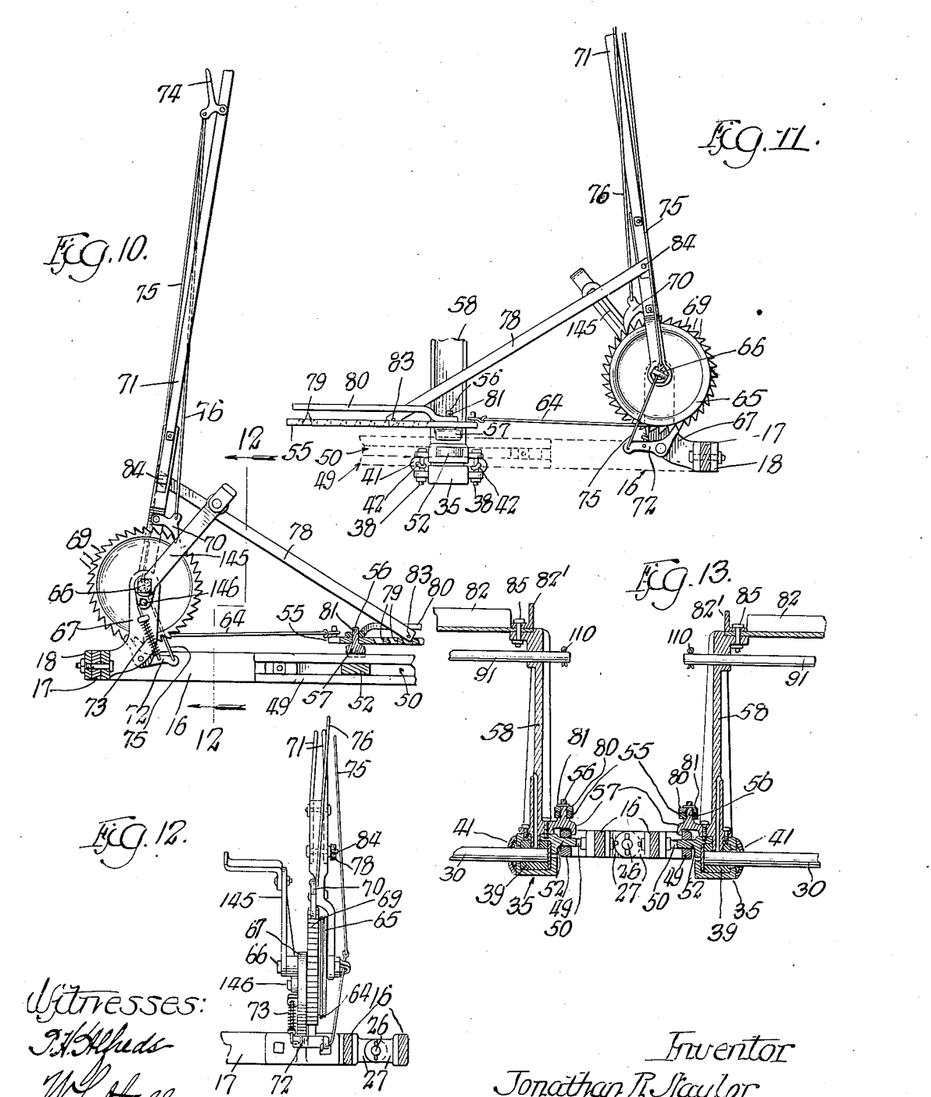
Fig. 10 is a detail, illustrating one of the levers for adjusting the angle of the disks to the path of the harrow, the section through the frame being taken on line 10—10 of Fig. 2.
Fig. 11 is a reverse view of said parts, showing the frame in dotted outline.
Fig. 12 is a detail section on line 12—12 of Fig. 10.
Fig. 13 is a detail section on line 13—13 of Fig. 2.
Figure 14:
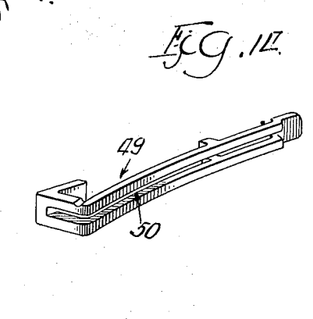
Fig. 14 is a perspective view of one of the brackets for supporting and guiding the swinging end of one of the disk shafts.

The means for positively swinging the inner ends of the disk shafts rearwardly consists of actuating pawls 78, 78 which are pivoted at their forward ends to the adjusting levers, near the lower ends of the latter, and extend rearwardly and downwardly therefrom and are adapted to engage at their rear ends a series of teeth or projections 79 formed on the upper sides of the spacing and connecting bars 55, as most clearly shown in Figs. 2, 10 and 11. The rear ends of said actuating pawls 78 are held from lateral displacement on the ratchet connecting bars and are guided with respect thereto by means of slotted guide bars 80, 80 which lie over the ratchet connecting bars 55 and are apertured at their ends to fit over the lugs 56. The said bars and pawls are held in position on said lugs by pins or keys 81, 81 which extend transversely through said lugs above the ends of said bars. The said guide bars 80 are vertically spaced from the ratchet connecting bars, and the rear ends of said pawls are held from rising entirely away from the ratchet bars by means of pins 83, 83 extending transversely through the pawls and beneath the guide bars. This arrangement permits the pawls to be raised to clear the ratchet teeth 79 and to move longitudinally of the ratchet connecting bars, but prevents complete detachment of the rear ends of the pawls from the ratchet bars. The forward upper ends of the pawls are removably pivoted to the levers 71 by means of bolts 84 over which the apertured forward ends of the pawls fit. The said pawls are adapted to be slipped laterally off of the pivot bolts to disconnect them from the levers 71. Conveniently the pawls may be applied to their pivot bolts between the levers 71 and the detent actuating wires 75 whereby the wires confine the pawls on said bolts, while providing ready means for their detachment. When the pawls are not in use they are detached from the levers and are shifted backwardly and lie over the ratchet bars, as indicated in dotted lines in Fig. 3. The pawls may in this manner be conveniently carried when not in use and are capable of being readily connected with the levers when occasion for their use occurs. When said shafts are to be adjusted rearwardly through the action of the adjusting levers 71, the actuating pawls 70 and locking detents 72 are released from the ratchet teeth of the winding drum through the action of the finger levers 74, after which the adjusting levers are swung rearwardly and act through the medium of the pawl 78 and the ratchet teeth 79 of the bars 55 to positively force the inner ends of the disk shafts rearwardly. Inasmuch as the drums are at this time free to rotate the cables 64 will freely unwind therefrom when the disk shafts are thus positively swung rearwardly.

Figure 15:
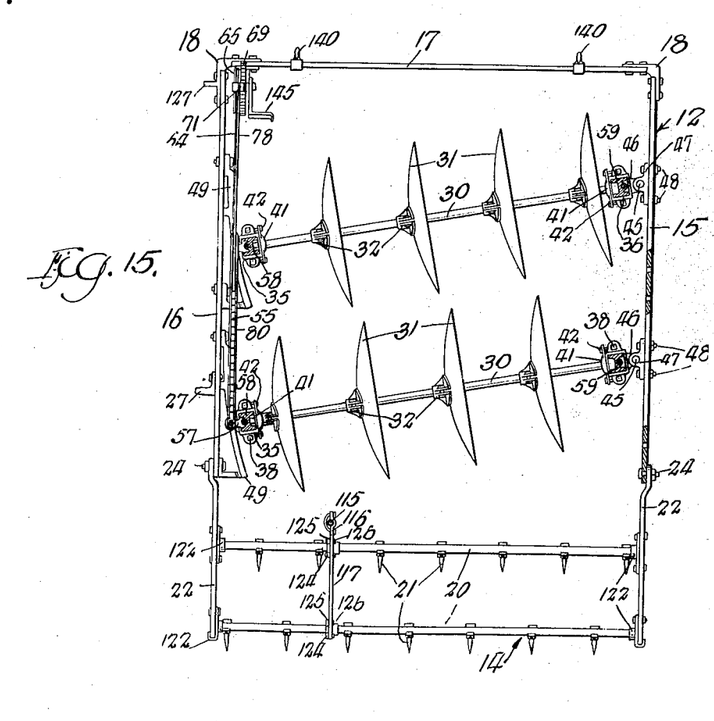
Fig. 15 is a horizontal sectional view, illustrating one section or side of the harrow, and showing the disks adjusted to throw the earth outwardly.

The disks are arranged in Fig. 2 to throw the soil from the sides inwardly toward the center of the harrow, they having their concave sides facing inwardly. The arrangement is such that the disk shafts 30 may be reversed end to end so as to adjust the disks with their concave sides facing outwardly, and in this manner operate to throw the soil from the center outwardly, as shown in Fig. 15. When this adjustment is effected the disk shafts will assume an inclination the reverse to that which they occupy when adjusted in a manner to throw the soil inwardly, as will be apparent from a comparison of Figs. 2 and 15. In order to effect this result the side members 15 of the harrow are provided along their length with a plurality of pairs of apertures to receive the bolts 48 by which the hinge lugs 47 are attached thereto, and the supporting and guide brackets 49 at the inner sides of the sections are arranged to be reversed end to end. When said disk shafts are to be adjusted to the positions shown in Fig. 15 the hinge lugs 47 are detached from the outer side members 15 and are shifted forwardly and are attached to said side members at points in advance of the positions shown in Fig. 2. The supporting and guide brackets are then detached from the inner side members of the sections and reversed end to end and attached to said side members with their laterally curved ends directed rearwardly so as to bring the curved grooves or ways thereof concentric with the new hinge points of the shafts. The inner ends of said disk shafts will now occupy a rearwardly inclined position in the section frames and this adjustment presents the disks to the soil in a proper manner to cut into or penetrate the soil as the harrow is dragged forwardly. The inner and outer bearing boxes are made alike to receive both ends of the shafts.

Figure 5:
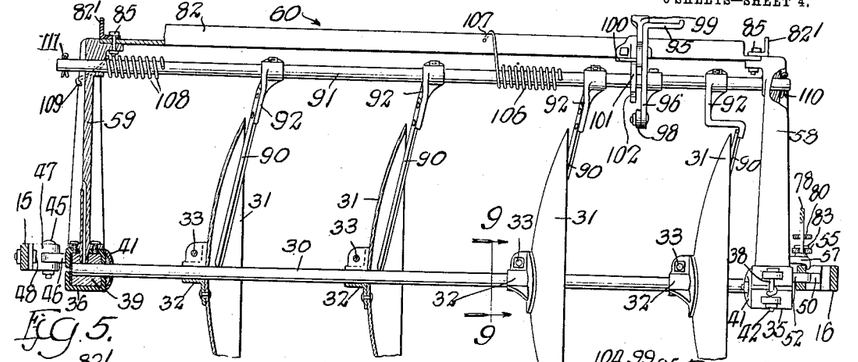
Fig. 5 is a detail section on line 5—5 of Fig. 2.
Figures 6, 7, 8, 9:
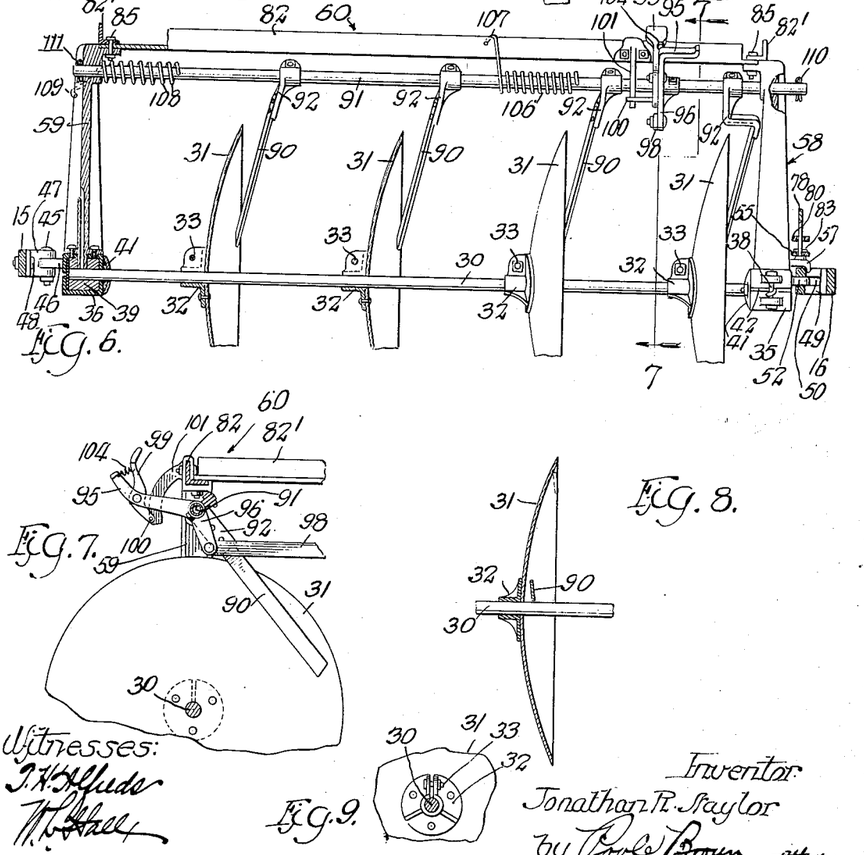
Fig. 6 is a similar view showing parts in changed positions.
Fig. 7 is a detail section on line 7—7 of Fig. 6.
Fig. 8 is a horizontal section taken through one of the disks and showing its scraper knife in its two extreme, or inoperative and operative, positions.
Fig. 9 is a detail section on the line 9—9 of Fig. 5.

The frame 60 which constitutes in part the inner and outer standards 58, 59, embraces horizontal front and rear side members 82, 82 and horizontal end members 82$^1$, 82$^1$ arranged in the form of a rectangle. The side members are rigidly connected to the standards 58, 59 by bolts 85, as shown in Figs. 5, 6 and 13, and the end members, which lie over the ends of the side members, are pivotally connected to the side members and said standards by said bolts 85. The said pivotal connection of the end frame members with the standards is necessary because of the fact that the said standards are shifted or swung with the bearing boxes of the disk shafts on which they are mounted.

The seat 61 is fixed to a supporting bar 86 mounted on the upper ends of downwardly and outwardly inclined standards 87, 87 which are loosely connected at their upper ends with the ends of said supporting bar 86 and at their lower ends with the side members 82 of the frame 60. The pivoted connection of said standards with the frame 60 and with the seat supporting bar 86 permits relative movement of the frames of the two harrow sections to correspond with the swinging adjustment of said disk shafts. The said standards 87 are connected to the frames 60 about midway of their lengths so that the seat and its supporting bar 86 move forwardly and rearwardly with the disk shafts to an extent approximately one-half of the swinging movement of the inner ends of the said shafts. Means, carried by said frame 60, are provided for scraping the soil therefrom to maintain the disks in a condition to cut into the soil. Such scraping or cleaning means comprise a plurality of scraping knives 90, one for each disk. Said scraper knives are carried by and extend downwardly from horizontal shafts 91, 91 located one over each set of disks and supported at their ends in bearings in the upper ends of the standards 58, 59 of the frame 60 (Figs. 1, 4, 5, 6 and 7). The scraper knives are located at the concave sides of the disks and are normally out of contact with the disks, their normal or inoperative positions being shown in Figs. 4 and 5. The shafts 91 are adapted to be rocked rearwardly, and as said knives move rearwardly they engage the inner sides of the disks near the rear sides of the latter in a manner to scrape the soil therefrom, as most clearly shown in Figs. 6 and 7. The said scraper knives are attached to fittings 92 which are clamped on the shafts 91 by means permitting the knives carried thereby to be adjusted longitudinally of the shafts toward and away from the disks and to space the knives on the shafts 91 to correspond with the spacing of the disks on their shafts 30. The said scraper knives are swung rearwardly against the marginal parts of the disks by devices made as follows: 95, 95 designate foot levers which are arranged in front of the upper parts of the frames 60 and are fixed to the front rock shafts 91 of each section. The said foot levers are provided with downwardly extending, rigid arms 96 which are connected with downwardly extending, rigid arms 97 of the rear rock shafts 91 by means of horizontally arranged links 98 which are pivoted at their ends to said arms 96 and 97. When said foot levers 95, therefore, are swung forwardly they act to rock the shafts 91 rearwardly and to swing the scraper knives rearwardly against the margins of the disks in a manner to clean or scrape the soil therefrom. The said foot levers 95 carry spring pressed locking detents 99 which are pivoted to the foot levers between the ends of the latter. The said locking detents 99 carry laterally extending pins or lugs 100 which ride over and are spring pressed into engagement with sectors 101 that are attached to and extend forwardly from the front members 82 of the frames 60. Said sectors are provided at their lower ends with notches 102 (Fig. 5) adapted to be engaged by the locking detent pins or lugs 100 when the foot levers are swung to their forwardmost positions to bring the scraper knives up against the marginal parts of the disks. The engagement of the pins or lugs 100 with the notches 102 serves to lock the scraping knives in their operative positions against the disks. The locking detents 99 are held with their pins or lugs 100 engaged with the sectors 101 by means of contractile spiral springs 104 in the manner shown in Fig. 7. Said locking detents 99 are released from engagement with the notched sectors 101 by swinging the upper ends of said detents rearwardly, against the action of the springs 104, and this may be effected by the foot of the operator.

The arrangement and inclination of the scraper knives relatively to the concave sides of the disks are such that the lower ends of the scraper knives are within and out of contact with the concave sides of the disks when in their vertical or inoperative positions, and when said knives are swung rearwardly the engagement of their ends with the curved marginal portions of the disks has the effect to force the knives at their connection with the shafts 91 laterally away from the disks and to move said shafts endwise in their bearings, provisions being made for such endwise movement of the shafts. Provisions are made for restoring the scraper knives to their normal inoperative positions when the locking detents are released, said restoring means operating to swing the scraper knives downwardly and also to shift them bodily toward the centers of the concave portions of the disks.

The means herein shown for swinging the scraping knives downwardly consist of spiral springs 106 located adjacent to the foot levers, as shown. Each of said springs surrounds its shaft 91 and is attached at one end to said shaft. The other end 107 of each spring extends upwardly and forwardly and is hook shaped to engage the forward member 82 of the frame 60. The springs are placed under tension when the shafts are rocked rearwardly and serve, when the locking detents 99 are released, to restore or rock forwardly said shafts.

The means herein shown for shifting the shafts 91 endwise in their restoring movements, and for shifting the scraper knives toward the disks as they are restored to inoperative position, consist of spiral contractile springs 108, 108 which surround the shafts 91 near the outer ends of the latter. Said springs are each attached at one end to its shaft 91, and the other end 109 thereof extends outwardly and is engaged with the adjacent standard 59 of the frame 60. The springs 108, thus arranged, tend to pull the shafts 91 outwardly and to shift the scraping knives toward the disks. The shifting effect of the springs 108 is arrested by stops consisting, as herein shown, of pins 110 which extend through transverse openings in the inner ends of the shafts, laterally inside the standards 58, and which, when brought into contact with said standards, limit further endwise movement of the shafts 91 and lateral movement of the scraper knives. The stops 110 are so adjusted as to arrest the lateral movement of the knives, under the action of the springs 108, when said knives are restored to inoperative positions before said knives are brought into contact with the edges of the disks at the upper sides thereof. The outer ends of the scraper knife carrying shafts 91 are also provided with stop pins 111 which engage the outer standards 59 to limit the inward endwise movement of said shafts.

Figure 4:
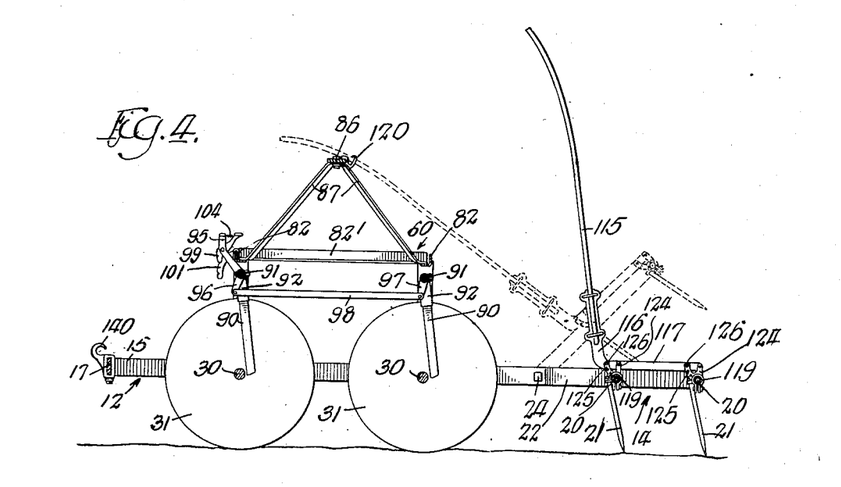
Fig. 4 is a transverse section on line 4—4 of Fig. 2.

The rear toothed sections 14 of the harrow are adapted to be raised about the hinge bolts 24 to the dotted line position shown in Fig. 4 by means of levers 115, 115 which are attached at their lower ends to upwardly extending arms 116, 116 of horizontal bars 117, 117 which extend transversely across and are attached by means of sleeves 119, 119 with the front and rear members 20, 20 of said hinged tooth sections. The sleeves 119 are clamped or otherwise fixed to the members of said tooth sections. The said hinged sections are adapted to be held in their upper position, so as to be carried by the harrow, out of contact with the ground, by means of hooks 120, 120, or other suitable fastening devices, which are carried by the seat supporting bar 86, as most clearly shown in Figs. 1 and 4.

I may provide means for adjusting the angle of the spike teeth 21, 21 relatively to the soil so that they may penetrate the soil more or less deeply. The means which I have herein shown for effecting this result are made as follows: The said members 20, 20 of the hinged tooth sections are mounted at their ends in socket fittings 122, 122 which are attached to the inner sides of the end members of the tooth sections, whereby said members may be angularly adjusted. The sleeves 119 by which the lifting lever bars 117 are connected with the members 20 of the tooth sections are each provided with two upwardly extending arms 124, 125. The arms 124 of each sleeve are permanently pivoted to the bars 117 (Fig. 4). The other arm 125 of each sleeve is curved concentrically with respect to the axis of the associated tooth section side member 20 and is provided with a plurality of apertures, either one of which is adapted to be engaged by a pin 126 that extends through and connects the curved arms with the bars 117. By removing the pins 126 and inserting them in other apertures of the arms 125, the angle of the spike teeth, relatively to the axes of the bars which carry the same, may be varied, as is obvious from an inspection of Fig. 4.

Figure 1:
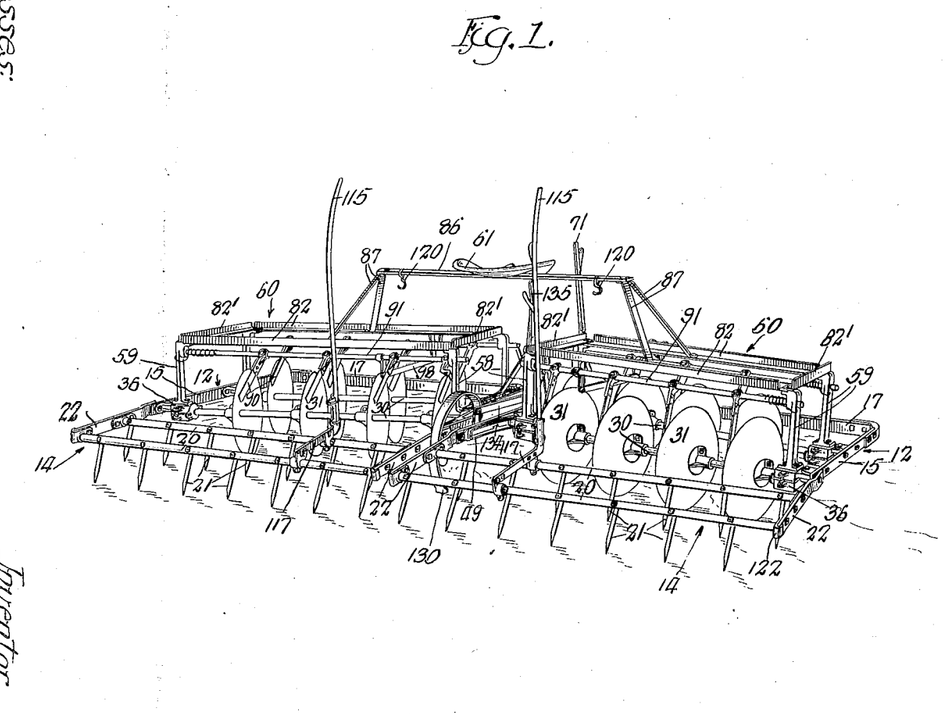
Figure 1 is a perspective view of a combined disk and toothed harrow embodying my invention.
Figure 3:
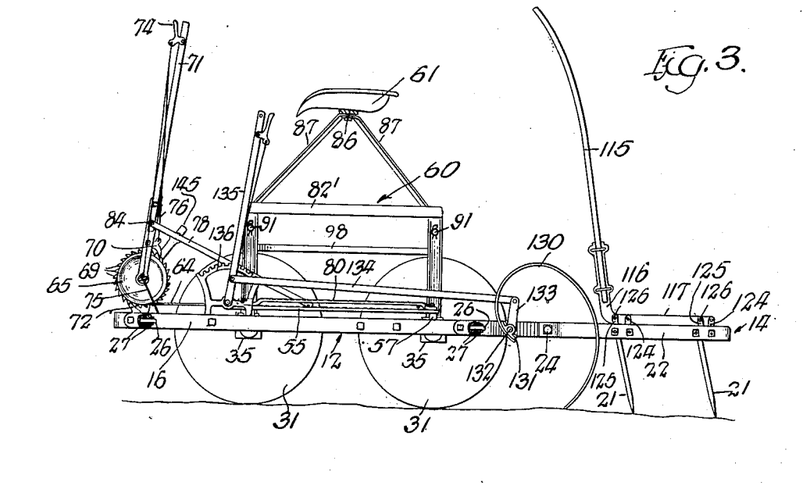
Fig. 3 is a transverse section on line 3—3 of Fig. 2.

In order that the soil between the harrow sections, and between the disks carried by said sections, may be cultivated I may provide a centrally arranged spring tooth 130, which is located between said sections at the rear side thereof (Figs. 1, 2 and 3). The said spring tooth is fixed to a fitting 131 that is pivotally mounted on a horizontal bolt or pin 132 which is attached to the inner member of one of the side or lateral sections. The said spring tooth fitting is provided with an upwardly extending arm 133 that is connected by a link 134 with a lever 135, whereby the spring tooth may be swung on its pivot and adjusted to penetrate the ground more or less deeply. The said lever 135 is adapted to be locked in adjusted positions, by a familiar form of spring latch, to a notched segment 136 which is attached to and rises from the inner side member of that section 12 on which the spring tooth is mounted.

It will be observed that, by reason of the employment of two or more sets of disks in each section, arranged one in rear of the other, the harrow is supported and horizontally balanced on the disks so that no occasion arises for the use of a tongue heretofore employed in disk harrows. The draft appliance consists of a horizontal draft bar 138 provided at points along its length with rings 139 which engage hooks 140 attached to and extending forwardly from the front members of the harrow sections. The said draft bar is connected by means of a chain or cable 141 with an evener 142 to the outer ends of which are attached double trees 143.

Foot rests 145, 145 are provided upon which the driver of the harrow who rides on the seat 61 may support his feet. The said foot rests are shown as supported on the bolts 66 which carry the winding drums 65, and are attached to the standards 67 which carry said drums by means of bolts 146 extending through lugs on said foot rests and into said standards, as shown in Fig. 12.

In practice the frames 60 may support or carry a protecting hood or casing over the disks to avoid liability of the rider's feet coming in contact with the disks or the driver being otherwise injured thereby. Manifestly also many changes in the structural details may be made without departing from the spirit of my invention, and I do not limit myself to such details except as hereinafter made the subject of specific claims.

I claim as my invention:—

1. In a harrow, a frame, transverse disk shafts, one in advance of the other, rotatively mounted in bearings carried by the sides of said frame, the bearing boxes at one side of the frame being hinged to the frame to permit the shafts to swing horizontally, brackets carried by the other side of the frame for supporting and guiding the bearing boxes at the swinging ends of the shafts, connecting and spacing bars extending between and interlocked with parts rigid with the bearing boxes, and means connected with said bars for giving movement to the swinging shafts.

2. In a harrow, a frame, transverse disk shafts, one in advance of the other, rotatively mounted in bearings carried by the sides of said frame, the bearing boxes at one side of the frame being hinged to the frame to permit the shafts to swing horizontally, brackets carried by the other side of the frame for supporting and guiding the bearing boxes at the swinging ends of the shafts, connecting and spacing bars extending between and interlocked with parts rigid with the bearing boxes, a rotative drum, a cable fixed at one end to the connecting and spacing bar and at its other end to the drum, and means for rotating the drum and for locking it from backward rotation.

3. In a harrow, a frame, transverse disk shafts, one in advance of the other, rotatively mounted in bearings carried by the frame, means whereby the shafts are swingingly connected with one side of the frame, means carried by the other side of the frame for supporting and guiding the swinging ends of the shafts, bars extending between and connecting and spacing the swinging ends of said shafts, a rotative drum, a cable fixed at one end to the connecting bar and at its other end to the drum, a lever for rotating said drum, a detent for locking the drum, said connecting and spacing bar being provided with a series of ratchet teeth, a pawl carried by said lever adapted to engage said ratchet teeth to shift the swinging ends of the shafts rearwardly, and means for releasing the drum when the shafts are thus swung rearwardly.

4. In a harrow, a frame, a disk shaft transversely arranged therein, disks carried by the shaft, boxes in which the ends of the shaft have rotative bearing, the bearing box at one side of the frame being hinged to the frame, a guiding and supporting bracket fixed to the other side of the frame in which the box at the swinging end of the shaft is supported and guided, said bracket being detachable from the frame and arranged to be reversed end to end thereon, and the hinged connection at the other side of the frame being detachable and arranged to be shifted from front to rear of the frame, and the bearing boxes and the shaft being constructed to permit the shaft to be reversed end to end in said bearing boxes.

5. In a harrow, two frames or sections hinged together at the center of the harrow, each provided with two disk shafts arranged one in advance of the other, disks mounted on said shafts, and a spring tooth arranged between said sections and mounted on one of the sections.

6. In a harrow, two frames or sections hinged together at the center of the harrow, each provided with two disk shafts arranged one in advance of the other, disks mounted on said shafts, a spring tooth pivoted to one of the sections, and an adjusting lever carried by the latter section for adjusting said spring tooth to the soil.

7. In a harrow, two lateral sections hinged together at the center of the harrow, rotative, transverse disk shafts in each section, one in advance of the other, bearing boxes at the sides of each section in which the ends of the shafts are rotatively mounted, the boxes at one side of each section being hinged to the side member thereof and the box at the other side of said section being guided and supported at the other side of the section, a frame supported upon and movable with the bearing boxes of each section, and a seat located centrally over the harrow and supported on the swinging frames of the two sections.

8. In a harrow, two lateral sections hinged together at the center of the harrow, rotative, transverse disk shafts in each section, one in advance of the other, bearing boxes at the sides of each section in which the ends of the shafts are rotatively mounted, the boxes at one side of each section being hinged to the side member thereof and the box at the other side of said section being guided and supported at the other side of the section, a frame supported upon and movable with the bearing boxes of each section, and a seat located centrally over the harrow, a support for said seat extending at its ends over said frames, and standards sustaining said seat support on said frames and loosely connected with the frames and with said support.

9. In a harrow, a frame, rotative disk shafts mounted transversely in the frame, disks adjustably secured to said shafts, means for swingingly connecting said shafts to one side of the frame, brackets attached to the other side of the frame for supporting and guiding the swinging ends of the shafts, means connecting the swinging ends of the shafts to cause the same to swing together and mean for adjusting said swinging ends of said shafts and locking them in adjusted positions.

In testimony, that I claim the foregoing as my invention I affix my signature in the presence of two witnesses, this 14th day of April A. D. 1909.

JONATHAN R. NAYLOR.

Witnesses:
WILLIAM L. HALL,
GEORGE R. WILKINS.